US008493032B2

(12) United States Patent  
Krauer

(10) Patent No.: US 8,493,032 B2
(45) Date of Patent: Jul. 23, 2013

(54) BIDIRECTIONAL POLYPHASE MULTIMODE CONVERTER INCLUDING BOOST AND BUCK-BOOST MODES

(75) Inventor: Jean-Pierre Krauer, San Jose, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 129 days.

(21) Appl. No.: 12/839,984

(22) Filed: Jul. 20, 2010

(65) Prior Publication Data

US 2012/0019212 A1    Jan. 26, 2012

(51) Int. Cl.
*H02J 7/00* (2006.01)
*H02J 7/04* (2006.01)
*H02J 7/16* (2006.01)

(52) U.S. Cl.
USPC ............ 320/137; 320/104; 320/127; 320/129

(58) Field of Classification Search
USPC ................ 320/137, 140, 104, 123, 127, 129, 320/160, 161, 162, 166, 167
See application file for complete search history.

(56) References Cited

U.S. PATENT DOCUMENTS

| | | | |
|---|---|---|---|
| 4,536,696 A | | 8/1985 | Ray |
| 5,500,579 A | | 3/1996 | Kim et al. |
| 6,737,756 B1 | * | 5/2004 | Gale et al. .......................... 290/7 |
| 7,023,107 B2 | * | 4/2006 | Okuda et al. ................. 307/10.1 |
| 7,868,569 B2 | * | 1/2011 | Iwashita et al. ............... 318/376 |
| 2004/0135545 A1 | * | 7/2004 | Fowler et al. ................. 320/118 |
| 2008/0238372 A1 | | 10/2008 | Cintra et al. |
| 2009/0121659 A1 | * | 5/2009 | Oyobe et al. ..................... 318/12 |
| 2009/0284079 A1 | | 11/2009 | Jahkonen |
| 2009/0322148 A1 | * | 12/2009 | Kitanaka ........................ 307/9.1 |
| 2010/0019728 A1 | * | 1/2010 | Ichikawa et al. .............. 320/134 |
| 2010/0231173 A1 | * | 9/2010 | Andrea et al. ................. 320/137 |
| 2010/0244775 A1 | * | 9/2010 | Smith ............................ 320/140 |
| 2010/0277132 A1 | * | 11/2010 | Hara et al. ..................... 320/163 |
| 2011/0050174 A1 | * | 3/2011 | King et al. ..................... 320/134 |

FOREIGN PATENT DOCUMENTS

WO    2008118477 A1    10/2008

\* cited by examiner

*Primary Examiner* — Drew A Dunn
*Assistant Examiner* — Alexis Boateng
(74) *Attorney, Agent, or Firm* — J. Richard Soderberg

(57) ABSTRACT

A charging method using a multiphase line voltage for charging an energy storage system (ESS) using a polyphase motor drive circuit communicated to a polyphase motor, the polyphase motor drive circuit including a plurality M of driver stages, one driver stage for each phase of the polyphase motor with each driver stage coupled across the energy storage system, the method including the steps of: (a) determining a charge mode responsive to a comparison of the multiphase line voltage to a voltage of the energy storage system, the determined charge mode including a boost mode when the voltage of the energy storage system has a first predetermined relationship to the multiphase line voltage and the determined charge mode including a boost-buck mode when the voltage of the energy storage system has a second predetermined relationship to the multiphase line voltage; (b) converting, when the charge mode includes the boost mode, the multiphase line voltage to a first charging voltage using a first set of N number of the plurality of driver stages, with N less than M, wherein the first charging voltage is communicated to the energy storage system, and wherein the first charging voltage is greater than the multiphase line voltage; and (c) converting, when the charge mode includes the boost-buck mode, the multiphase line voltage to a second charging voltage using a second set of P number of the plurality of driver stages when in the boost-buck mode, with P greater than N, wherein the second charging voltage is communicated to the energy storage system, and wherein the second charging voltage is less than the multiphase line voltage.

4 Claims, 2 Drawing Sheets

US 8,493,032 B2

BIDIRECTIONAL POLYPHASE MULTIMODE CONVERTER INCLUDING BOOST AND BUCK-BOOST MODES

BACKGROUND OF THE INVENTION

The invention relates generally to charging of rechargeable energy storage systems (e.g., batteries and electric double-layer capacitors and the like) and more particularly to charging storage systems in conditions when a peak line voltage is greater than a storage system voltage, such as may be the case, for example, with a low state-of-charge (SOC) for the energy storage system.

The voltage across the energy storage system varies as a function of SOC and line voltages used for recharging have an inherent variation as well. Relevant to this invention is the difference between the peak line voltage available to the charger and the voltage across the energy storage device being charged. In many high-energy applications (e.g., electric vehicles and industrial applications and the like), the energy storage system includes parallel and series connected cells and modules that have a net voltage greater than typical line voltages. In these typical cases, the charging systems include a voltage converter to up-convert, or boost, the line voltage to the desired level for charging.

Rechargeable energy storage systems are often charged from an AC line source that includes characteristics of a peak voltage (V) and a volts root mean square (VRMS). For a sinusoidal voltage, average voltage VRMS is equal to peak voltage divided by the square root of two. In the United States, conventional line voltages are identified as average voltages and are supplied at about 110 VRMS though sometimes 240 VRMS is supplied (and is often single phase though three-phase is not uncommon). Thus, 110 VRMS is about equal to 155 Volts (peak). Of course, other countries may use other values.

For an example, consider use of 240 VRMS as a nominal line voltage. The actual line voltage varies over time, for this example it will be a +/−10% voltage variation (e.g., a +10% greater voltage for 240 VRMS means the peak voltage could be about 370 Volts (240 VRMS*1.1*1.414)). The 370 Volts is compared to the voltage across the energy storage system. In some cases, when the energy storage system is at a lower end of its SOC, the voltage across it system may be ~330 Volts which is less than the maximum peak line voltage of 370 Volts.

The topology of many voltage converters is often such that the voltage converter cannot charge the energy storage system in this mode, that is when the peak line voltage exceeds the voltage of the component being charged. (Depending upon circuit topology, one reason the voltage converter cannot charge battery assembly is because the described relative voltages results in uncontrollable current flow out of the converter, potentially seriously damaging the converter and/or the energy storage system.) This is undesirable to say the least, particularly given the consequences of damage and costs of the components in an electric vehicle or other high-energy system.

Solutions for electric vehicles must often meet tight budgets for space, weight, and component costs. Solutions to address the special case of a too-high line voltage relative to the voltage of the energy storage system advantageously have low impact on the existing design in terms of additional components, circuits, and the like.

What is needed is a charging system that is capable of providing high energy to a high performance energy storage assembly for charging the energy storage assembly while efficiently and safely handling conditions of a too "high" line-in voltage relative to a voltage level of the energy storage assembly.

BRIEF SUMMARY OF THE INVENTION

Disclosed is a charging system and method that is capable of providing high energy to a high performance energy storage system for charging the energy storage system while efficiently and safely handling conditions of a too "high" line-in voltage relative to a voltage level of the energy storage system. The charging system using a multiphase line voltage for charging an energy storage system (ESS) using a polyphase motor drive circuit communicated to a polyphase motor, the polyphase motor drive circuit including a plurality M of driver stages, one driver stage for each phase of the polyphase motor with each driver stage coupled across the energy storage system, the system including: a converter, coupled to the energy storage system and to the plurality of driver stages, having a boost mode and a boost-buck mode, the converter converting the multiphase line voltage to a first charging voltage using a first set of N number of the plurality of driver stages when in the boost mode, with N less than M, wherein the first charging voltage is communicated to the energy storage system and wherein the first charging voltage is greater than the multiphase line voltage, and the converter converting the multiphase line voltage to a second charging voltage using a second set of P number of the plurality of driver stages when in the boost-buck mode, with P greater than N, wherein the second charging voltage is communicated to the energy storage system and wherein the second charging voltage is less than the multiphase line voltage; a mode control, responsive to a voltage comparison between the multiphase line voltage and an ESS voltage of the energy storage system, for changing the converter from the boost mode to the boost-buck mode when the multiphase line voltage has a first predetermined relationship to the ESS voltage and for changing the converter from the boost-buck mode to the boost mode when the multiphase line voltage has a second predetermined relationship to the ESS voltage; and a controller, coupled to the converter and to the mode control, for operating the converter and the mode control to charge the energy storage system in the boost mode and in the boost-buck mode.

A charging method using a multiphase line voltage for charging an energy storage system (ESS) using a polyphase motor drive circuit communicated to a polyphase motor, the polyphase motor drive circuit including a plurality M of driver stages, one driver stage for each phase of the polyphase motor with each driver stage coupled across the energy storage system, the method including the steps of: (a) determining a charge mode responsive to a comparison of the multiphase line voltage to a voltage of the energy storage system, the determined charge mode including a boost mode when the voltage of the energy storage system has a first predetermined relationship to the multiphase line voltage and the determined charge mode including a boost-buck mode when the voltage of the energy storage system has a second predetermined relationship to the multiphase line voltage; (b) converting, when the charge mode includes the boost mode, the multiphase line voltage to a first charging voltage using a first set of N number of the plurality of driver stages, with N less than M, wherein the first charging voltage is communicated to the energy storage system, and wherein the first charging voltage is greater than the multiphase line voltage; and (c) converting, when the charge mode includes the boost-buck mode, the multiphase line voltage to a second charging voltage using a second set of P number of the plurality of driver stages when in the boost-buck mode, with P greater than N, wherein the second charging voltage is communicated to the energy storage system, and wherein the second charging voltage is less than the multiphase line voltage.

The preferred implementations of the present invention include use of the charging system in an electric vehicle. In this context, the addition of a few components that include a relay/contactor, inductor, capacitor, and additional sense circuitry allows construction of a multimodal converter that operates in a boost charger mode for "normal" operation and switches to a boost-buck charger mode for "special case" operation.

Further, implementations of this charger are capable of bi-directional operation—the energy storage system may be charged from a line voltage source as is typical of charging systems, and it may operate in "reverse" and provide an externally available AC voltage from the energy storage system in a "power" mode.

Other features, benefits, and advantages of the present invention will be apparent upon a review of the present disclosure, including the specification, drawings, and claims.

DETAILED DESCRIPTION OF THE INVENTION

Figure 1:
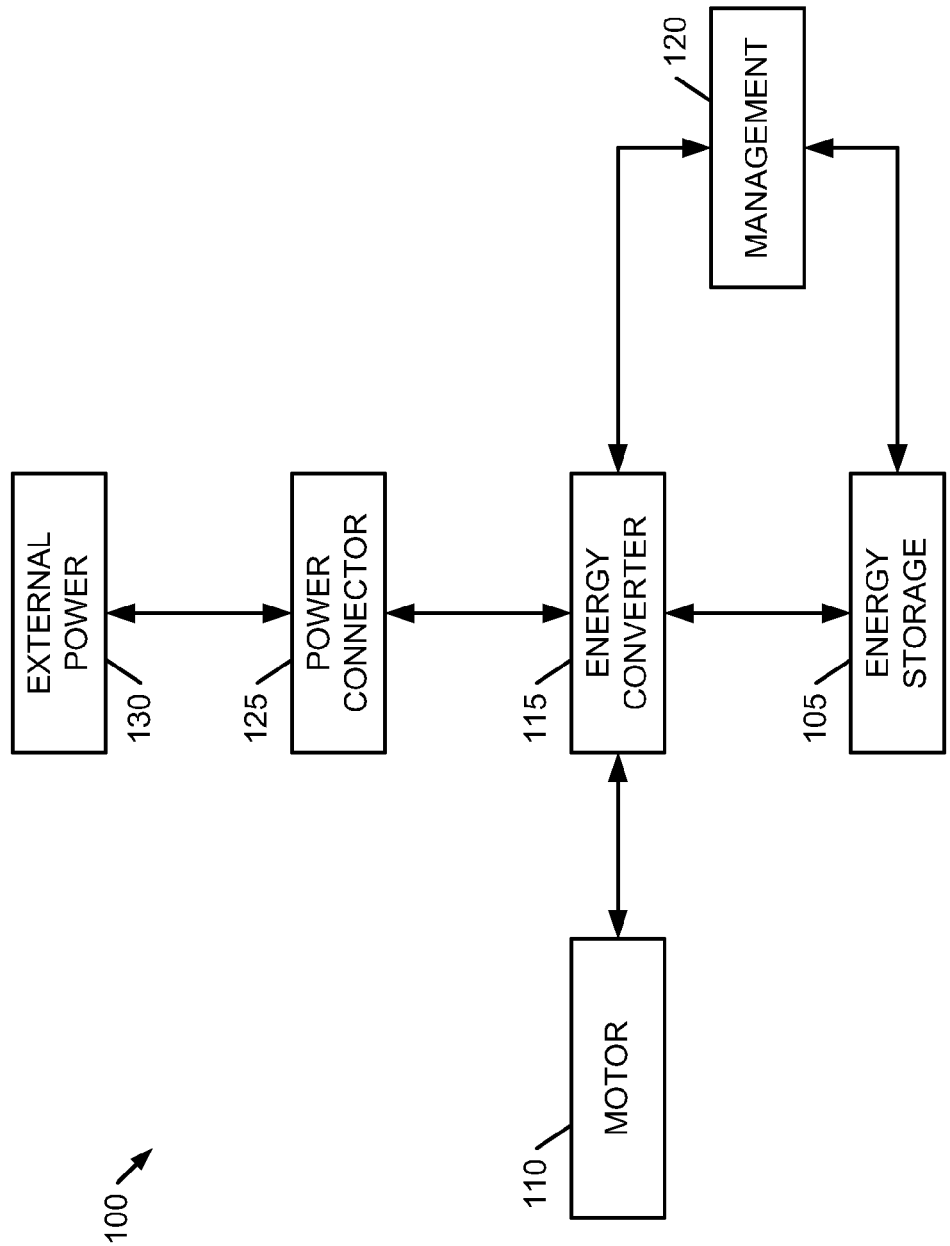
FIG. 1 is a schematic block diagram for a representative electric motor system incorporating a preferred embodiment of the present invention.

Embodiments of the present invention provide methods and systems for a voltage converter that is capable of providing high energy to a high performance energy storage assembly for charging the energy storage assembly while efficiently and safely handling conditions of large relative differences between a line-in voltage and voltage level of the energy storage assembly. The following description is presented to enable one of ordinary skill in the art to make and use the invention and is provided in the context of a patent application and its requirements. In the following text, the terms "energy storage assembly" "battery", "cell", "battery cell" and "battery cell pack" "electric double-layer capacitor" and "ultracapacitor" may be used interchangeably (unless the context indicates otherwise" and may refer to any of a variety of different rechargeable configurations and cell chemistries including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other chargeable high energy storage type/configuration.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Embodiments of the present invention are applicable to systems that employ electric motors in general, and more specifically to vehicles using multiphase electric induction motors. Electric vehicles (EVs) include vehicles that have one or more sources of stored energy designed to provide electrical energy to the vehicle, wherein the electrical energy is used to at least in part to provide some energy used to propel the vehicle. Electric vehicles may include vehicles designed to carry passengers, to transport goods, or to provide specialty work capabilities. For example, electric vehicles include passenger automobiles, trucks, and recreational watercrafts such as boats. In addition, electric vehicles include specialty vehicles, such as fork trucks used to lift and move cargo, vehicles that incorporate conveyor belts to move objects, such as mobile conveyor belt vehicles used to load and unload cargo such as luggage from airplanes, and specialty equipment used in areas where exhaust fumes from typical gasoline, diesel, or propane powered equipment may present hazards to personnel, such as in underground mining operations. In various instances, electric vehicles are designed and intended to be operated on public highways as licensed automobiles, including both cars and trucks.

Generally, an electric vehicle includes some form of a device or devices capable of storing energy and that is operable to provide electrical power to the vehicle. The electrical power may be used to at least in part provide energy for propelling the vehicle. In some instances, the electrical power is used to provide the energy required for all of the vehicle's functions, including propelling the vehicle. In many instances, the source of the stored energy is a rechargeable battery pack. In various embodiments, a rechargeable battery pack includes a plurality of individual rechargeable battery cells that are electrically coupled to provide a rechargeable battery pack.

U.S. Pat. No. 5,341,075 issued 23 Aug. 1994 describes a combined battery recharge and motor drive system that employs a polyphase pulse width modulated inverter and a polyphase motor which may be reconnected to operate in a battery recharge mode. The contents of this patent are hereby expressly incorporated in its entirety by reference thereto, for all purposes.

FIG. 1 is a schematic block diagram for a representative electric motor system 100 incorporating a preferred embodiment of the present invention. To simplify further discussion, system 100 will be described below in the context of an electric vehicle. However it is understood that system 100 may be part of another device or system other than an electric vehicle. System 100 includes an energy storage system (ESS) 105 that includes a vehicle propulsion battery or the like and at least one propulsion motor 110 for converting energy into mechanical motion, such as rotary motion. ESS 105 includes various components associated with transmitting energy to and from the vehicle propulsion battery in various examples, including safety components, cooling components, heating components, rectifiers, and the like. ESS 105 may be implemented in many different ways and include many different components, but for purposes of this example, ESS includes a propulsion battery, ultracapacitor, or the like. Thus, the present subject matter should not be construed to be limited to the configurations disclosed herein, as other configurations are possible and within the scope of the present invention.

The propulsion battery of ESS 105 of this example includes one or more lithium ion batteries. In some examples, the battery includes a plurality of lithium ion batteries coupled in parallel and/or series. Some examples include cylindrical lithium ion batteries. In some cases, ESS 105 includes one or more batteries compatible with the 18650 battery standard, but the present subject matter is not so limited. Some examples include approximately 2981 batteries which are interconnected. The vehicle propulsion battery used in ESS 105, in some examples, provides approximately 390 volts.

Additionally system 100 includes an energy converter 115. Energy converter 115 converts energy from ESS 105 into energy useable by motor 110. In some instances, there is energy flow from motor 110 into ESS 105 through energy converter 115. ESS 105 transmits energy to energy converter 115, which converts the transmitted energy into energy usable by motor 110 to propel the electric vehicle. Motor 110 may also generate energy that is transmitted to energy converter 115. In these instances, energy converter 115 converts the transmitted energy from motor 110 into energy which may be stored in ESS 105. As shown below in connection with an exemplary FIG. 2, energy converter 115 includes semiconductor power devices such as transistors. These transistors may include one or more field effect transistors. Some examples include metal oxide semiconductor field effect transistors. Some examples include one or more insulated gate bipolar transistors. As such, in various examples, the energy converter 115 includes switching elements which are configured to receive direct current (DC) power from ESS 105 and to output multiphase (e.g., three-phase) alternating current (AC) to power motor 110. As noted above, it is sometimes the case that energy converter 115 is configured to convert a three-phase output from motor 110 to DC power to be stored in ESS 105. Some configurations of energy converter 115 convert energy from ESS 105 into energy usable by electrical loads other than motor 110. Some of these examples switch energy from approximately 390 Volts of ESS 105 to 14 Volts (DC).

In this example, motor 110 is a three phase AC motor. Sometimes system 100 may include a plurality of such motors. The vehicle optionally includes a transmission, such as a 2-speed transmission, though other examples are possible. Manually clutched transmissions are contemplated, as are those with hydraulic, electric, or electrohydraulic clutch actuation. Some examples employ a dual-clutch system that, during shifting, phases from one clutch coupled to a first gear to another coupled to a second gear. Rotary motion is transmitted from the transmission to the wheels via one or more axles.

A management system 120 is optionally provided which provides control for one or more of ESS 105 and energy converter 115. In some cases, management system 120 is coupled to a vehicle system which monitors safety (such as a crash sensor). In some examples management system 120 is coupled to one or more driver inputs (such as a speed adjuster, colloquially termed a throttle, although the present subject matter is not limited to examples having an actual throttle). Management system 120 is configured to control power to one or more of ESS 105 and energy converter 115.

A power connector 125 accesses an external power source 130, e.g., a charging station, to receive energy and communicate it with ESS 105 through energy converter 115. In some examples, the charging station converts power from a single phase 110V AC power source into power storable by ESS 105. In additional examples, the charging station converts power from a 220V AC power source into power storable by ESS 105. Some implementations include single-phase line voltages while others employ polyphase line voltages. FIG. 1 illustrates an implementation in which energy converter 115 converts power from energy source 130 to energy storable by ESS 105.

In "normal" operation, a user connects external power 130 to power connector 125. The voltage of external power 130 is less than the voltage across the chargeable energy storage element of ESS 105, therefore energy converter 115 "boosts" the voltage level in order to charge ESS 105 to the desired state-of-charge (SOC). Energy converter 115 operates in a boost mode for this normal operation. When the desired SOC is reached, charging is suspended.

There is the special case when the voltage of external power 130 is greater than the voltage of the relevant storage element of ESS 105. In this case, typical prior art configurations for energy converter 115 could result in uncontrolled current flows, potentially damaging components of system 100. To reduce risks of this happening, energy converter 115 is changed from the boost mode to a boost-buck mode. In the boost-buck mode, energy converter 115 down converts the voltage from external power 130 to the appropriate voltage level for charging.

The special case may occur for several different reasons, including variations in the amplitude of the voltage of external power 130 above its nominal value, or because the voltage across ESS 105 is low because of a depleted SOC. Sense circuitry monitors the voltage of external power 130 and compares it to the voltage across ESS 105. To err on the side of caution, a safety margin is built-in to switch energy converter 115 to the boost-buck mode when the voltage of external power 130 has a predetermined relationship to the voltage across ESS 105 that is close to the risk point. For example, when the voltage of external power 130 is at least 95% (other values are possible for the threshold but less than 100%) of the voltage of ESS 105, energy converter 115 may be switched to the boost-buck mode. For the special mode, when sufficient energy has been added into ESS 105, and/or when the line voltage changes, so that the voltage of ESS 105 exceeds the line voltage by a sufficient margin, energy converter 115 is reconfigured for the normal operation and changes from the boost-buck mode to the boost mode.

Charging is somewhat faster in the boost mode than in the boost-buck mode, with the boost mode also more efficient, so it is desirable to operate energy converter 115 in boost mode whenever possible. The boost-buck mode is advantageous for the special case and permits charging to occur when it otherwise would have needed to have been suspended. The boost-buck mode includes a further advantage of being able to provide very low charging voltages, such as the type of voltage that is useable to repair a storage element that has had too much energy depleted. Special charging procedures are often necessary to repair such a storage element, and those special charging procedures often require a very low charging voltage.

In some implementations, energy converter 115 includes a power mode in addition to the boost mode and the boost-buck mode. The power mode is available to system 100 when external power 130 is disconnected from connector 125. The power mode provides for converting energy from ESS 105 into typical AC line voltages. As further described herein, energy converter 115 in the power mode converts 390 VDC from ESS 105 to a typical AC line voltage (e.g., 110 Volts AC). The line voltage may be made available from power connector 125, with the line voltage used in powering electrical loads external to the electric vehicle.

System 100 may include a uni-directional implementation with energy converter 115 having either (i) both boost mode and the boost-buck mode (common) or (ii) the power mode. A bi-directional implementation for system 100 provides for energy converter 115 having all three modes.

Figure 2:
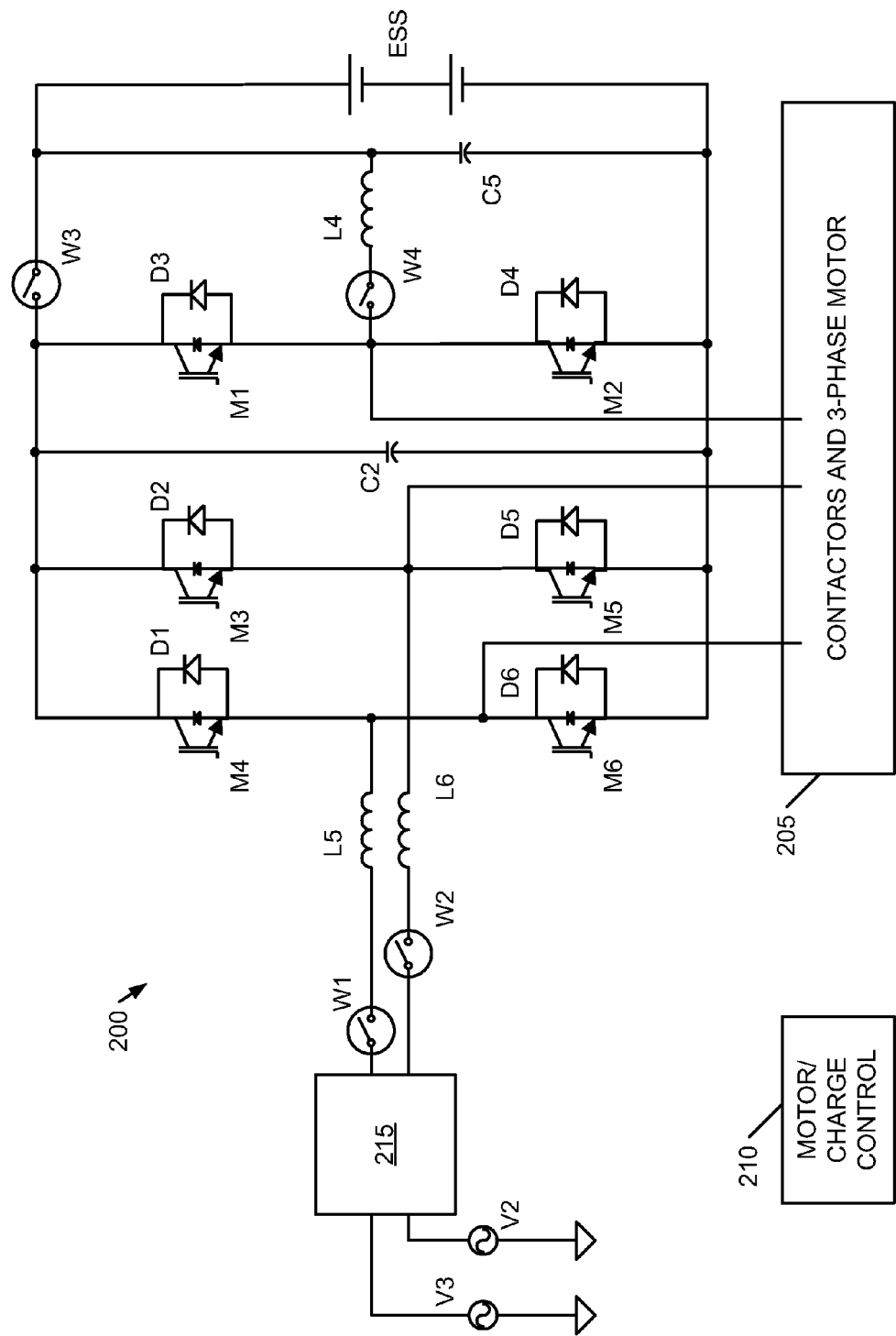
FIG. 2 is a schematic diagram of a multi-modal multiphase charging system.

FIG. 2 is a schematic diagram of a multi-modal multiphase charging system 200 that includes some elements of system 100 shown in FIG. 1, principally detailed are elements of energy converter 115. System 200 will be described in the context of an electric vehicle using a 3-phase electric induction motor 205, though other implementations are possible. System 200 includes a plurality of semiconductor motor driver stages, one motor driver stage for each phase of motor 205. Therefore in this example there are three motor driver stages. Each driver stage includes a pair of power transistors (for example transistor M1 and transistor M2, shown as NPN insulated gate bipolar transistors but other transistors may be used) with the emitter of M1 coupled to both the collector of M2 and to one of the power inputs of motor 205. The collector of M1 is coupled to a first terminal (e.g., the positive terminal) of an energy storage system (ESS) and the emitter of M2 is coupled to a second terminal (e.g., the negative terminal) of the ESS. The ESS may include, for example, one or more batteries or ultracapacitors or the like). Each transistor is coupled to a diode, an anode of the diode coupled to the emitter of the transistor and a cathode of the diode coupled to the collector of the transistor. Thus a diode D3 is coupled to M1 and a diode D4 is coupled to M2. The other driver stages include M3 coupled to M5 (with D2 and D5 respectively) and M4/D1 coupled to M6/D6. For operating motor 205, all three driver stages are controlled by a motor/charge control 210 to drive motor 205 using energy from the ESS. The motor driver stages converting the DC voltage of the ESS to the AC voltage required by motor 205. System 200 includes an EMI filter 215.

As noted above, it is desirable to meet reduced budgets for weight, size, cost, and component count, particularly when system 200 is part of an electric vehicle. System 200 uses the semiconductors of the motor driver stages during charging, and in some implementations, windings of motor 205 may also be used as buck inductors. In some configurations, it is sufficient to provide only a boost-mode for charging. In this boost-mode-only configuration, it is sufficient to use two driver stages, for example M4/M6 as a first driver stage and M3/M5 as a second driver stage.

In the charging mode, two AC line input voltages (V2 and V3) having different phases are provided from an external power source. EMI filter 215 may, for example, include inductances and capacitances, and is used to filter V2 and V3. A throw of a first AC line contactor W1 is coupled to a filtered V3 and a throw of a second AC line contactor W2 is coupled to a filtered V2. A pole of W1 is coupled to a first node of a first boost inductance L5 and a pole of W2 is coupled to a first node of a second boost inductance L6. A second node of L5 is coupled to the emitter of M4 and a second node of L6 is coupled to the emitter of M3. A capacitance C2 coupled across the ESS completes the boost-mode configuration. A pole of a third contactor W3 is coupled to the collectors of M1, M3, and M4, and a throw of W3 is coupled to the positive terminal of the ESS.

In charging mode, contactor W1, contactor W2, and contactor W3 are closed and motor/charge control 210, coupled to each driver stage, operates the first driver stage and the second driver stage to boost and rectify V2 and V3 to the desired DC voltage for the ESS. This configuration is applicable to the normal mode described above in which V2 and V3 are both below a voltage of the ESS. The ESS is isolated from ground so the it normally floats meaning that an average of the battery voltage is equal to an average of the AC line voltages.

For the special case, when either V2 or V3 is above the voltage of the ESS, system 200 is configured to operate in a boost-buck mode. As noted above, the boost mode uses only two of the three motor driver stages, so a third motor driver stage (M1/M2) is available. Use of this driver stage as described herein adds a buck conversion ability to system 200 and allows for use of a boost-buck mode during the special case.

The buck conversion ability is added into system 200 by including a boost-buck inductance L4, a capacitance C5, and a fourth contactor W4, along with sense circuitry to establish the voltage levels of V2/V3 relative to the voltage of the ESS and to determine the appropriate operational mode based upon predetermined thresholds and comparisons of the voltages. Capacitance C5 is disposed in parallel to the ESS. A pole of W4 is coupled to the emitter of M1 and a throw of W4 is coupled to a first node of L4. A second node of L4 is coupled to the positive terminal of the ESS.

In the special case when a combination of V2 an V3 is greater than the voltage of the ESS, system 200 operates in the boost-buck mode. In the boost-buck mode, W3 is opened and W4 is closed. Motor/charge control 210 then operates all three motor driver stages to charge the ESS to the desired level from V2 and V3.

The added components coupled to the third driver stage are operated in a boost mode during pre-charge of DC bus capacitor C2. In this mode, W4 is closed and W3 is opened, and motor/charge control 210 switches M2 on and off with D3 rectifying the boosted voltage. This mode boosts the voltage from ESS to a desired bus voltage above the peak line voltage on C2.

As noted above, system 200 may operate in a power mode, such as when V2 and V3 are unavailable. In the power mode, the DC voltage from the ESS is converted to an AC line voltage to energize loads not a part of system 200, at a discretion of an operator of the system. Configuration and operation of the power mode includes generation of AC power at an "inlet" of the charger so the charging system is able to be used as an AC source for other devices and systems, particularly for devices and systems external to the charger.

As described above, motor driver stages are configured so that two driver stages operate in the boost mode (e.g., a first motor driver stage with transistors M4/M6 and a second motor driver stage with transistors M3/M5) and one motor driver stage of M1/M2 provide buck components for the boost-buck mode. The boost mode uses M6 and D1, and also M5 and D2, to boost voltage from Vline to capacitance C2. Boost-Buck mode bucks the voltage on C2 by pulse width modulation of M1, with D4 catching inductor L4. When charging from input voltage at the inlet, M6/D1 and M5/D2 boost the input voltage for charging and M1/D4 form a buck converter. In the "reverse" mode (i.e., the power mode), M2 and D3 form a boost converter and either M4/D6 or M3/D5 form a buck converter.

In the power mode, M2 ramps current in L4 and releases the energy into D3 to charge C2, forming a boost converter. C2, now being charged, provides energy to the other motor driver stage(s) with, for example, M4 turning on and ramping current in L5. When M4 turns off, D6 catches L5 and continues to release energy to line voltage input (which becomes the output for the AC voltage).

To configure 200 for reverse operation, contactors W1, W2, and W4 are closed with W3 opened, what was the buck stage becomes a boost stage, and what was the boost stage becomes an AC inverter. The motor driver stages of M4/M6 and/or M3/M5 are operated with a pulse width modulation control to produce a sinewave, resulting in an average voltage on L5/L6 to be an AC voltage. EMI filter 215, in this case, acts as an output filter to produce a sinewave at V2/V3. Opening W4, closing W3, W2, and W1 bypasses M1/M2 (no boosting) and the other motor driver stages form an AC inverter with power directly from the ESS.

The system above has been described in the preferred embodiment of charging a multicell energy storage module used in electric vehicle (EV) systems. In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A charging system using a line voltage for charging an energy storage system (ESS) using a polyphase motor drive circuit communicated to a polyphase motor, the polyphase motor drive circuit including a number M of driver stages, M>1, one driver stage for each phase of the polyphase motor with each driver stage coupled across the energy storage system, the system comprising:

a configurable converter using a selectable number of the plurality M driver stages to configure one of a boost converter using N, N<M, driver stages and a boost-buck converter using said N driver stages and an additional driver stage of the plurality of M driver stages, said configurable converter including a first charging capacitance coupled across the ESS and a second charging capacitance coupled across the ESS and further including N number of boost inductances coupling the line voltage to said N driver stages and a boost-buck inductance coupling said additional driver stage to said second charging capacitance;

a first selector selectively coupling said driver stages and said first capacitance to the ESS and to said second capacitance, said first selector coupling said driver stages and said first capacitance to the ESS and to said second capacitance for said boost converter and interrupting said coupling of said driver stages and said first capacitance to the ESS and to said second capacitance for said boost-buck converter;

a second selector selectively coupling said additional driver stage to said boost-buck inductance, said second selector interrupting said coupling of said additional driver stage to said boost-buck inductance for said boost converter and coupling said additional stage to said boost-buck inductance for said boost-buck converter; and a controller, coupled to said selectors and to the M driver stages and responsive to a comparison of the line voltage and a voltage of the ESS, configuring said selectors for said boost converter and said configurable converter as said boost converter when said comparison determines the line voltage is less than said voltage of the ESS and configuring said selectors for said boost-buck converter and said configurable converter as said boost-buck converter when said comparison determines the line voltage is greater than said voltage of the ESS, said controller operating said N driver stages without said additional stage to up-convert the line voltage to a first charging voltage when charging the ESS using said boost converter, and said controller operating said N driver stages and said additional driver stage to convert the line voltage to a second charging voltage when charging the ESS using said boost-buck converter.

2. The charging method of claim 1 wherein the polyphase motor includes a winding associated with each phase with each said winding including a winding inductance and wherein said boost-buck inductance includes one of said winding inductances.

3. The charging system of claim 1 wherein M is 3 and N is 2.

4. The charging system of claim 1 wherein each of the M driver stages includes a semiconductor motor driver stage.

* * * * *